(12) United States Patent
Andrae

(10) Patent No.: US 9,351,342 B2
(45) Date of Patent: May 24, 2016

(54) INVERTER WITH MONITORING OF THE MOISTURE STATE AND METHOD FOR OPERATING AN INVERTER

(71) Applicant: SMA Solar Technology AG, Niestetal (DE)

(72) Inventor: Ralf Andrae, Calden (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 339 days.

(21) Appl. No.: 14/107,271

(22) Filed: Dec. 16, 2013

(65) Prior Publication Data

US 2014/0166635 A1 Jun. 19, 2014

Related U.S. Application Data

(63) Continuation of application No. PCT/EP2012/061443, filed on Jun. 15, 2012.

(30) Foreign Application Priority Data

Jun. 17, 2011 (DE) .......................... 10 2011 106 632

(51) Int. Cl.
H02M 1/32 (2007.01)
H05B 1/02 (2006.01)
H02J 3/38 (2006.01)
H02M 7/00 (2006.01)

(52) U.S. Cl.
CPC .............. *H05B 1/0227* (2013.01); *H02J 3/383* (2013.01); *H02M 1/32* (2013.01); *H02M 7/003* (2013.01); *Y02E 10/563* (2013.01)

(58) Field of Classification Search
None
See application file for complete search history.

(56) References Cited

U.S. PATENT DOCUMENTS

| | | | |
|---|---|---|---|
| 8,067,715 B2 * | 11/2011 | Peterson et al. ............... | 219/386 |
| 8,106,333 B2 | 1/2012 | Kangas | |
| 8,390,140 B2 | 3/2013 | Bolln et al. | |
| 2004/0132398 A1 | 7/2004 | Sharp et al. | |
| 2008/0223843 A1* | 9/2008 | White ............................ | 219/209 |
| 2012/0009066 A1 | 1/2012 | Vilbrandt et al. | |

(Continued)

FOREIGN PATENT DOCUMENTS

| | | | |
|---|---|---|---|
| CN | 201590608 U | * | 9/2010 |
| CN | 103257661 A | * | 8/2013 |

(Continued)

OTHER PUBLICATIONS

CN201590608U, Qiu, Sep. 2010, partial translation.*

(Continued)

*Primary Examiner* — Joseph M Pelham
(74) *Attorney, Agent, or Firm* — Eschweiler & Associates, LLC

(57) ABSTRACT

An inverter for converting electrical power from a DC voltage generator is disclosed. The inverter includes a moisture sensor inside a housing of the inverter, and a control unit for controlling the inverter connected to the moisture sensor for receiving a moisture value from the moisture sensor. The inverter also includes a heating element connected to the control unit. The control unit is configured to control the inverter based on the moisture value such that, in the case where a limit value for the moisture is exceeded, the voltage at an input of the converter unit lies below an arc-avoiding voltage value and electrical power is fed to the heating element. Furthermore, a method for operating an inverter of this type is disclosed.

28 Claims, 5 Drawing Sheets

(56) References Cited

U.S. PATENT DOCUMENTS

| | | | |
|---|---|---|---|
| 2012/0105235 A1 | 5/2012 | Dietrich et al. | |
| 2012/0192921 A1* | 8/2012 | Tiittanen et al. | 136/248 |
| 2013/0128454 A1* | 5/2013 | Koivuluoma et al. | 361/691 |
| 2015/0189694 A1* | 7/2015 | Snygg et al. | 219/209 |

FOREIGN PATENT DOCUMENTS

| | | | |
|---|---|---|---|
| DE | 102006060815 A1 | | 6/2008 |
| DE | 102007043512 A1 | * | 3/2009 |
| DE | 102009021238 A1 | | 11/2010 |
| DE | 102011000737 A1 | * | 8/2012 |
| DE | 202014101916 U1 | * | 6/2014 |
| EP | 1993195 A2 | | 11/2008 |
| WO | 2004040724 A2 | | 5/2004 |

OTHER PUBLICATIONS

CN201590608U, Qiu, Sep. 2010, Abstract.*
CN103257661A, Jiang et al, Sep. 2010, Abstract.*
International Search Report & Written Opinion of the International Searching Authority dated Apr. 12, 2013 for International Application No. PCT/EP2012/061443. 11 Pages.

* cited by examiner

INVERTER WITH MONITORING OF THE MOISTURE STATE AND METHOD FOR OPERATING AN INVERTER

REFERENCE TO RELATED APPLICATIONS

This application is a continuation of international application number PCT/EP2012/061443 filed on Jun. 15, 2012, which claims priority to German application number 10 2011 106 632.6 filed on Jun. 17, 2011.

FIELD

The disclosure relates to an inverter for converting and feeding electrical power from a DC voltage generator, in particular from photovoltaic installations (PV installations), into a power grid, and to a method for operating such an inverter.

BACKGROUND

The generation of electrical energy with the aid of photovoltaics is increasingly gaining in importance. A multiplicity of decentralized power generation installations of this type have been installed globally in the meantime, wherein the typical supply power as an essential characteristic feature of these installations is increasing at the same time. Particularly in the case of a high supply power, it is customary to interconnect a large number of PV modules in series to form a so-called string, which is connected to the inverter. As a consequence, high DC voltages are present on the input lines of the inverter during operation. In order to prevent the formation of arcs inside the inverter housing, which would lead to damage or destruction of the inverter, sufficient isolation distances are provided between the voltage-carrying conductors. Nevertheless, arc events in inverters occur from time to time, which in the extreme case can lead not just to the destruction of the inverter, but as a consequence also to fires if the effects of the arc do not remain restricted to the interior of the housing. Therefore, for safety reasons, solid metal housings (sheet-metal or die-cast housings) are usually used which, over a certain time duration, can limit these effects of a burning arc to the housing interior, but which also make up a high proportion of the production costs.

Arcs are often triggered by the fact that sufficient moisture has accumulated in the interior of the inverter, such that along the surfaces creepage paths between the voltage-carrying components can form which can bridge the isolation distances. When voltage is present creepage currents flow along the creepage paths which can intensify to form arcs or cause corrosion which in turn, on account of an increase in contact resistances, can lead to consequential problems such as device failures or contact heating through to fire. Experience shows that even in the case of housings in which the interior is protected by a high protection class against external influences, for example by the protection class IP65 customary in the case of inverters, moisture can accumulate in the interior over the course of time. This is frequently caused by a pressure equalizing element which compensates the volumetric change of the air in the housing caused by temperature fluctuations, by exchanging air with the surrounding environment. Through the pressure equalizing element, moist ambient air can pass into the housing, with the result that relatively large quantities of moisture accumulate in the housing interior over the course of time even when direct entry of water does not take place.

The document WO 2004/040724 discloses a switchgear cabinet for electronic devices such as computers, the climate values of which such as temperature and air humidity are monitored and actively influenced. However, this technical teaching can be applied only to a limited extent to inverters, whose air-conditioning possibilities for their housing interior are limited. At the same time, diverse documents exist which describe apparatuses and methods where PV generators are electrically disconnected from the inverters and/or short-circuited if a hazard situation (such as a fire, an arc and an overheating) is detected. By way of example, reference is made to the document DE10 2006 060815 at this juncture. What is disadvantageous about these solutions is that the measures are initiated only after the occurrence of the damaging event.

Furthermore, the document DE102009013311 discloses a control unit of a wind power installation equipped with temperature and moisture sensors in order to protect the control unit against overheating or corrosion. In addition, the document DE102007054215 discloses such wind power installations equipped with a preheating device that preheats the temperature critical components to operating temperature before the wind power installation is started up. In both cases, the installation generates no energy as long as the temperature and/or the moisture values are not in a desired range.

SUMMARY

In order to avoid or limit the harmful effects of moisture that has penetrated an inverter housing, it is desirable to prevent the abovementioned damaging processes or other undesirable processes associated with the creepage currents. At the same time, it is desirable to transfer the inverter from an initial state without or with reduced supply, in particular such a state in which moisture in the device interior causes an insufficient electrical insulation between voltage-carrying conductors, as rapidly as possible into a device state in which the inverter can be operated normally, i.e. in particular using generator voltages which are typical for a maximum power output (maximum power point—MPP) of the DC voltage generators.

An inverter according to the disclosure for converting electrical power from a DC voltage generator, in particular a PV generator, by means of a converter unit into a grid-conform AC voltage for feeding the electrical power into a power grid connected to the inverter accordingly comprises a moisture sensor inside a housing of the inverter. The control unit is connected to the moisture sensor for receiving a moisture value from the moisture sensor. The moisture sensor is designed to determine the moisture value, i.e. a value indicating the quantity of moisture situated in the housing, in particular of the air humidity or of a condensation liquid, and to communicate it, e.g. as a signal, to the control unit for controlling the inverter. Dependent on the determined moisture value, particularly if the quantity of moisture exceeds a limit value, the control unit controls the converter in such a way that the voltage at an input of the converter unit is kept to a value below an arc-avoiding voltage value. At the same time, the control unit ensures that electrical power is fed to a heating element connected to the control unit.

The electrical power fed to the heating element serves to heat the interior of the inverter housing, in order to remove the moisture from the housing or at least from the insulation regions between the voltage-carrying conductors. For this purpose, in one embodiment the heating element is embodied as a resistive heating element, for example as a resistive wire or as a conductor path on or in a circuit board, in the latter case particularly of a multilayer circuit board. In this case the heating element is positioned such that the insulation regions are rapidly heated, with the result that moisture that has condensed there can be effectively removed. The removal of the moisture can be increased by using an inverter comprising a fan, in the air flow of which the heating element is arranged or which is positioned such that it can distribute the heat generated by the heating element effectively in the device.

The removal of the moisture from the housing or from the insulation regions is monitored with the aid of one or a plurality of moisture sensors positioned, for example, in the vicinity of connection conductors of the DC voltage generator or in the vicinity of other voltage-carrying conductors (for example in the vicinity of an intermediate direct current link of the inverter). It is likewise possible to position a moisture sensor in the vicinity of a moisture collecting region of the housing, i.e. a region in which condensate typically collects or, in the case of an inverter heated as a result of operation, evaporates only at a later point in time. This may be, for example, the deepest point in the inverter housing or a location in the housing where the air flow of a fan does not reach or reaches only inadequately.

In parallel with the removal of the moisture, the damaging influence of the moisture, particularly with regard to arc formation, is reduced by keeping the voltage at the input of the converter unit below a specific voltage value. In this case, the voltage value is chosen such that only voltages which are less than a maximum permissible still arc-avoiding voltage value occur within the housing. In this context, the term arc-avoiding voltage value is taken to mean a value of the voltage which is so low that given the quantity of moisture present in the housing of the inverter it is ensured that it is possible to prevent the flow of currents between the voltage-carrying conductors in the interior of the inverter which are so high that an arc can arise therefrom, or that corrosive processes particularly at the contacts of the voltage-carrying conductors damage the latter in such a way that in the long term the contact resistance of the contacts increases considerably and leads to a power loss or a failure of the inverter. In this case, the arc-avoiding voltage value is dependent both on the quantity of moisture present and on the isolation distances and the materials used in the inverter. It is typically assumed that at voltages of less than 80 V the probability of the formation of arcs in an inverter is sufficiently low. Given corresponding dimensioning of the distances and choice of materials, higher values, for example 120 V or 200 V, can also be regarded as sufficiently arc-avoiding. It is evident to the person skilled in the art that the electrical power available to the heating element increases greatly if a higher voltage can be permitted for the DC voltage generator. It is thereby possible to greatly shorten the necessary time duration until the limit value for the moisture is undershot, i.e. the inverter is dehumidified.

In one advantageous configuration of the inverter, in the case where the limit value for the moisture is exceeded, the control unit controls the inverter via the converter unit in such a way that the voltage of the DC voltage generator lies below the arc-avoiding voltage value. In this configuration, in an advantageous manner, the generator voltage and thus the voltage at the input of the converter unit is kept below the arc-avoiding voltage value via the converter unit itself. It is also possible for the entire converter unit to comprise an interconnection of a DC/DC converter (for example of a step-up converter) and a DC/AC converter. In this case, it goes without saying that both the voltage of the DC voltage generator and the voltage at the input of the DC/AC converter are kept below the arc-avoiding voltage value. This can be done both by deactivating the DC/DC converter and by choosing a correspondingly low voltage value of the DC voltage generator with the DC/DC converter activated. The converter unit of an inverter is usually already designed to set the voltage of the generator, for example in order to be able to operate the DC voltage generator at the MPP. This setting possibility is now utilized in the context of the application in order not to exceed the arc-avoiding voltage value, wherein the power provided here by the DC voltage generator can be utilized at the same time. Utilization can be effected in the form of a supply. In one embodiment, for the purpose of utilization, the electrical power fed to the heating element can be drawn at least partly from the DC voltage generator.

In a case where the electrical power fed to the heating element originates completely from the DC voltage generator, it is advantageous to provide an AC switch, e.g. a contactor, for the switchable disconnection of the inverter from the power grid, the switch being connected to the control unit in such a way that the inverter remains disconnected from the power grid as long as the limit value for the moisture is exceeded, and the inverter is connected to the power grid only when the limit value for the moisture is undershot.

In a further advantageous configuration of the inverter, in the case where the limit value for the moisture is exceeded, the control unit controls the inverter in such a way that the DC voltage generator is disconnected from the input of the converter unit. In this way, too, it is possible to prevent the arc-avoiding voltage value from being exceeded.

In a further advantageous configuration of the inverter, the electrical power fed to the heating element is drawn at least partly from the power grid. For this purpose, the control unit can be designed in such a way that in the case of the limit value for the moisture being exceeded, the DC voltage generator is or remains disconnected from the inverter and a preheating power is fed to the heating element exclusively from the power grid. However, provision can also be made for the power fed to the heating element to be drawn from the DC voltage generator and the power grid. The heating power drawn exclusively or additionally from the power grid makes it possible to further shorten the time duration for dehumidifying the inverter, since the electrical power available for preheating and thus for dehumidifying the inverter can be chosen optimally.

In a further advantageous configuration, the inverter can furthermore comprise a protection unit, to which is connected at least one safety sensor for monitoring the housing interior with regard to the occurrence of a hazard event. In this case, the protection unit is designed, in the case of the occurrence of the hazard event, to isolate the inverter from the DC voltage generator and from the power grid and thus to prevent any power flow into the interior of the inverter.

It should be mentioned in this connection that the term hazard event is taken to mean any event in which the electrical power flowing through the inverter is converted into heat in an uncontrolled manner. Therefore, a hazard event within the meaning of the application encompasses, in particular, events such as arcs or thermal overloads of components of the inverter such as power switches, capacitors or inductors. Corresponding safety sensors can comprise smoke detectors, electrical arc detectors, which detect the high-frequency oscillations generated by the arcs, or optical or infrared detectors. The optical or infrared-optical sensors can enable a spatially resolving detection, for example. It is likewise possible to assign individual sensors, also other, conventional temperature sensors such as thermoelements, thermodiodes, etc., to inverter components that are particularly jeopardized. Alternatively, a selective monitoring of regions or individual components of the inverter can also be achieved by the use of spatially resolving optical or infrared-optical detectors, as a result of which the reliability of the detection of hazard events can be increased while at the same time reducing the probability of false alarms.

In the case of effectively safeguarding the inverter upon the occurrence of the abovementioned hazard events with the aid of the protection unit and the assigned safety sensors, it is possible to replace the costly metal housings of the inverters by more cost-effective housings composed of plastic, in particular composed of plastics having flame-retarding properties. This rules out the occurrence of an uncontrolled conversion of electrical power from the generator or from the power grid into heat through the inverter to the extent that safety requirements with regard to release of the energy into the surroundings can only be prevented by a metal housing.

A method according to the disclosure for operating an inverter for feeding a power generated by a DC voltage generator into a power grid comprises determining a moisture value inside a housing of the inverter, for example by means of a moisture sensor. If a limit value for the moisture value is exceeded, a generator voltage of the DC voltage generator is set in such a way that both the generator voltage and a voltage possibly converted therefrom by a DC/DC converter (for example a step-up converter) are kept below an arc-avoiding voltage value. In this case, a power generated by the DC voltage generator and/or a power drawn from the power grid are/is at least predominantly converted into heat within the housing. It is only when the determined moisture value falls below a limit value for the moisture that the generator voltage is set to an MPP voltage. In this case, the inverter can operate the DC voltage generator with maximum power emission and feed the generated power into the power grid.

In one embodiment, these method acts are carried out as part of a start-up operation of the inverter, for example in the morning at sunrise, since the probability of deficient isolation distances is particularly high in this case, e.g. on account of possible formation of condensation at inverters not yet warmed up operationally.

In order to shorten the time duration in which the inverter sets a lower DC voltage at the generator, it is advantageous to carry out the process of determining the moisture value repeatedly or continuously until the limit value is undershot. For the same reason, it is also advantageous to convert the entire power transmitted from the DC voltage generator to the inverter into heat in the housing, for which purpose an independent heating element or else a component integrated in the inverter anyway for converting the power can be used. In the latter case, the converter unit is suitable, for example, which enables a momentary, pulsed current flow by means of suitable driving of the switches incorporated therein. In the case of very short driving of the switches, the latter become conductive only partly and a considerable part of the power is converted into heat as switching losses at high driving frequency in the switches, which would be undesirable during normal operation.

For monitoring and diagnosis of the inverter it is helpful to detect the time duration until the limit value is undershot, or the frequency with which the inverter exceeds the limit value for the moisture at least temporarily when carrying out the method according to the disclosure and to make it available for an evaluation. It is thus possible to identify particularly affected inverters and, if appropriate, to notify a service engineer, who can eliminate problems with ingress of moisture.

In one advantageous development of the operating method, in the case where the limit value is exceeded, the inverter is disconnected from the DC voltage generator and the power converted into heat in the housing is drawn exclusively from the power grid. In the case where the limit value for the moisture value is exceeded, accordingly, the inverter is heated by means of an electrical power drawn from the power grid until the moisture value falls below the limit value. It is only then that the DC voltage generator is connected to the inverter and a generator voltage is set at which a maximum power emission (MPP voltage) of the generator is effected for feeding to the power grid.

Optionally, in the context of the operating method according to the disclosure, the housing interior of the inverter can additionally be monitored with regard to the occurrence of a hazard event and the inverter can be disconnected from the power grid and from the DC voltage generator if such an event occurs. Such a hazard event may be the evolution of smoke in the inverter, which can be monitored by means of a smoke detector. It is likewise possible to monitor the occurrence of an arc by means of optical or electrical arc detectors, or to detect excessive heating of components of the inverter by means of infrared-sensitive detectors or temperature sensors. In this case, optical and infrared-sensitive detectors have the further advantage that they can likewise ascertain the opening of the housing on account of the incident external light and protect the inverter immediately by isolation from the power grid and the generator, as a result of which the endangerment of a person who opens the inverter is avoided or at least considerably reduced. In this case, the inverter can emit further warning signals, e.g. acoustic or electrical signals.

BRIEF DESCRIPTION OF THE DRAWINGS

The disclosure is illustrated below with reference to figures, which should be interpreted in an elucidating, but not in a restrictive manner. In the figures.

DETAILED DESCRIPTION

Figure 1:
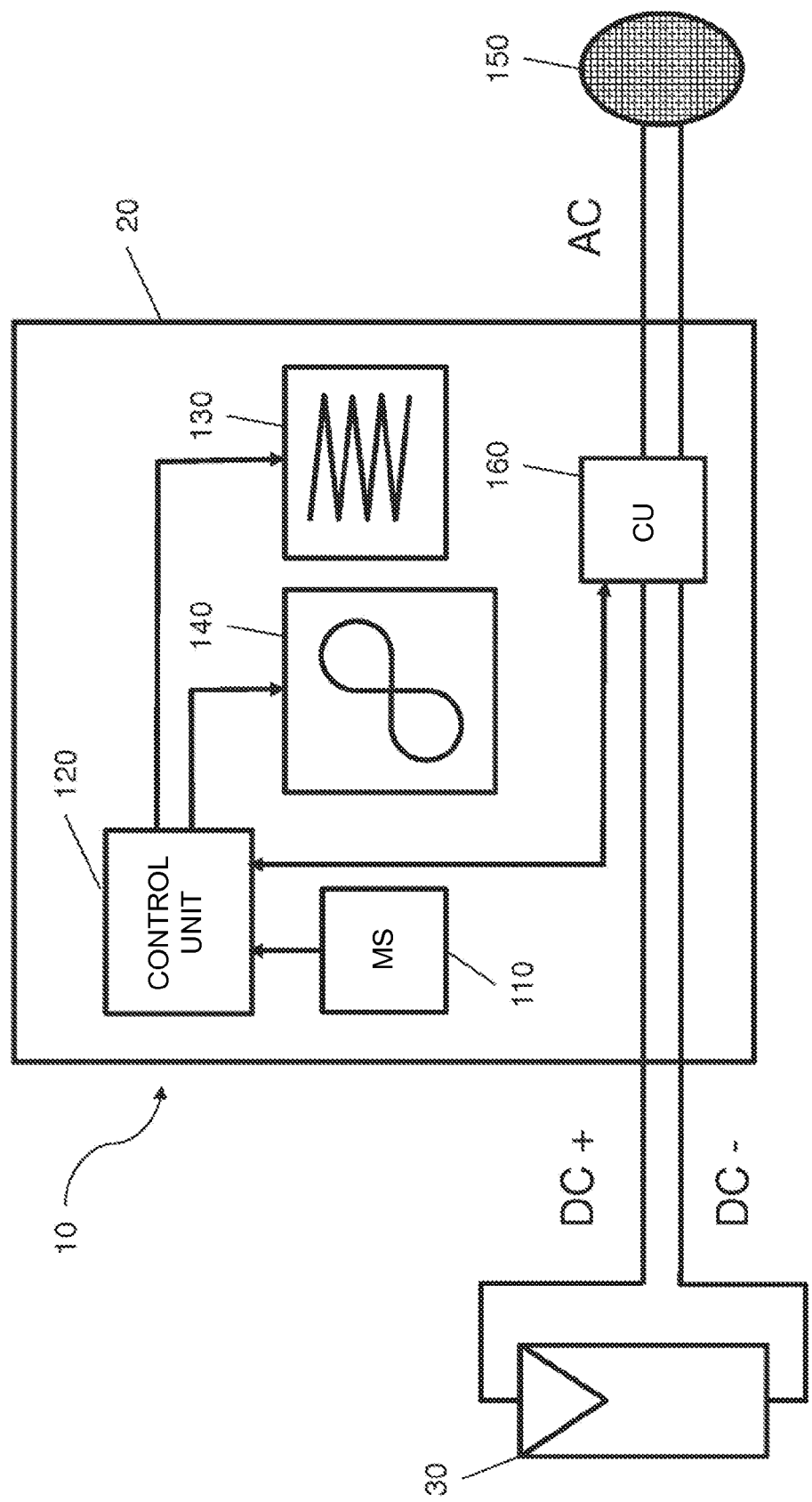
FIG. 1 shows a schematic illustration of components of an inverter according to the disclosure.

FIG. 1 shows an inverter 10 according to the disclosure, which is connected to a DC generator 30 for energy transmission via connecting lines DC+, DC−. A converter unit (CU) 160 is arranged in the interior of a housing 20 of the inverter 10, which converter unit converts the power of the generator 30 into a grid-conform AC voltage and transmits it to a connected power grid 150 via connecting lines AC. Furthermore, a moisture sensor (MS) 110 is accommodated inside the housing 20, and communicates a measurement signal corresponding to the moisture value to a control unit 120. The control unit 120 is configured to control the inverter 10, in particular the converter 160, and is connected to a heating element 130, such that the power transmitted to the heating element 130 can be controlled by the control unit 120. Optionally, the control unit 120 can furthermore likewise be configured to drive a fan 140, which can distribute the heat generated by the heating element 130 in the interior of the housing 20.

The moisture sensor (MS) 110 is a conventional moisture sensor, for example a sensor whose conductivity changes on account of the moisture, or one which contains a dielectric having a moisture-dependent dielectric constant. Other previously known moisture sensors are likewise conceivable.

The control unit 120 can draw the electrical power which it forwards to the heating element 130 from the converter unit 160, for example. In this case, the converter unit 160 comprises a DC/DC converter, in particular a step-up converter, an intermediate direct current link and a converter bridge, such that the converter unit can perform both the task of converting DC voltage into AC voltage and the control of the generator voltage of the DC voltage generator 30.

Although the converter unit 160 in FIG. 1 in accordance with the description comprises an interconnection of a DC/DC converter and a DC/AC converter, it is also possible that the converter unit 160 can be equipped without a DC/DC converter. It is likewise possible for the electrical power to be drawn directly from the DC generator 30 or the connected power grid 150.

In one specific embodiment, the heating element 130 is formed by switches or other components of the converter unit 160. In this case, it is advantageous to design the control unit 120 such that the driving of the converter unit 160 generates the desired quantity of heat.

Figure 2:
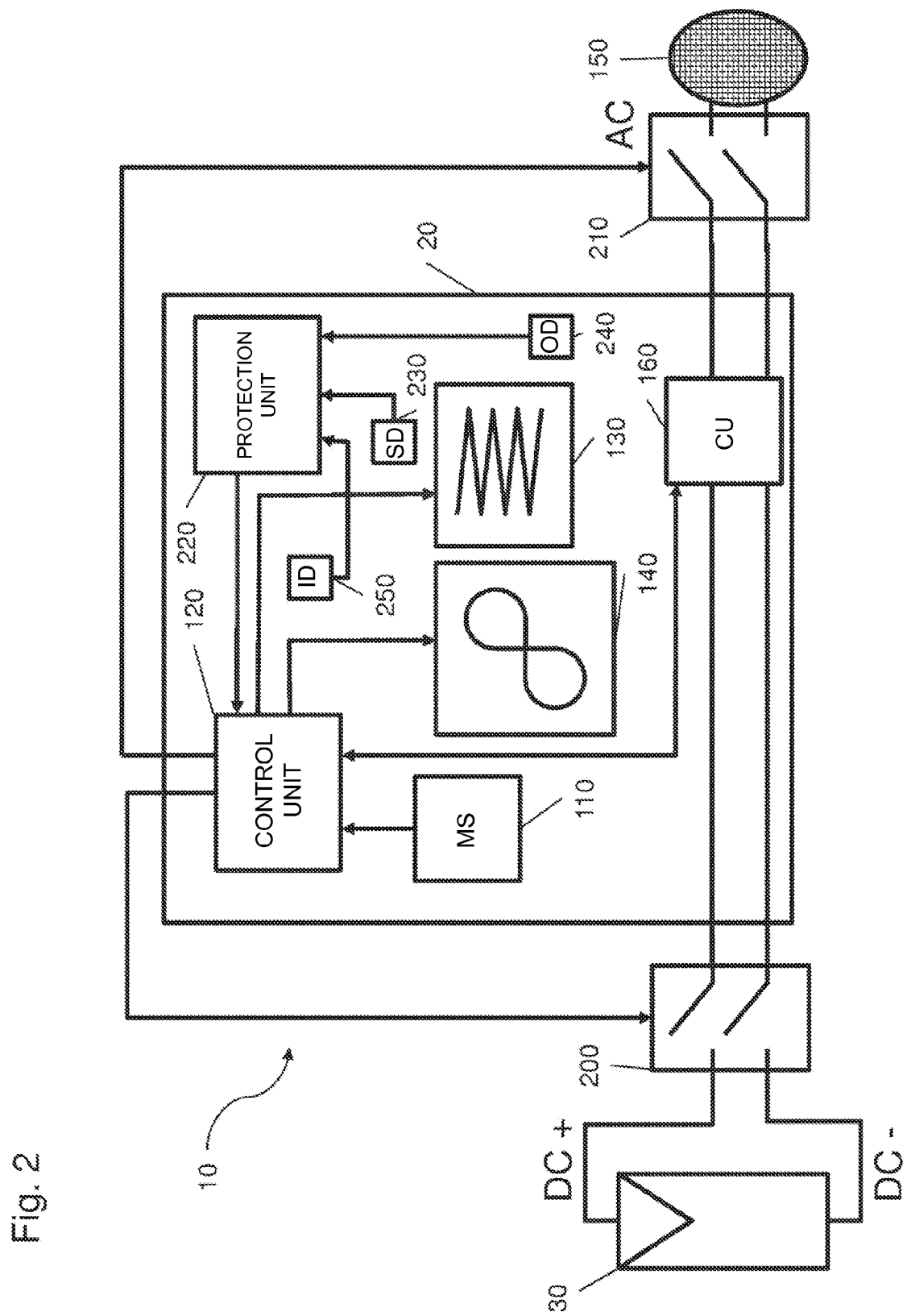
FIG. 2 shows a schematic illustration of components of a further inverter according to the disclosure, augmented by additional components.

FIG. 2 shows an inverter according to the disclosure, which additionally comprises, over and above the components already shown in FIG. 1, a protection unit 220, which is configured to reliably transfer the inverter into a safe state when a hazard event occurs, by virtue of the protection unit 220 controlling the connection to the DC generator 30 by means of a DC switch 200, e.g. a DC contactor, and/or to the power grid 150 by means of an AC switch 210, e.g. an AC contactor or line breaker, such that, when the hazard event occurs, any supply of energy into the interior of the inverter housing 20 is prevented. The arrangement of the switches 200, 210 can be realized both outside the inverter housing 20 and in the interior thereof. For this purpose, the protection unit 220 is connected to the control unit 120 for communicating an isolating signal, wherein the control unit 120 performs the corresponding driving of the DC switch 200 or of the AC switch 210 when the isolating signal is present. Of course, it is likewise possible for the protection unit 220 to drive the switches 200, 210 directly.

The occurrence of such an event is monitored by a number of sensors which are accommodated inside the inverter housing 20 and are connected to the protection unit 220. Such sensors can comprise a smoke detector (SD) 230, an optical detector (OD) 240 or an infrared detector (ID) 250. As soon as one of these safety sensors detects a state which is assigned to a hazard event, the protection unit 220 or the control unit 120 isolates the electrical connection to the generator 30 or to the power grid 150.

Through the combination of components for the controlled dehumidification of the inverter with components for the reliable detection of hazard events in the interior of the inverter, it is possible to reduce the risk of the occurrence of fire-triggering events to an extent such that it becomes possible to fashion the housing of the inverter from plastic. A further reduction of the risk is possible if flame-retarding plastics are used as material of the housing. A considerable reduction of costs in the production of inverters is possible in this way.

Figure 3:
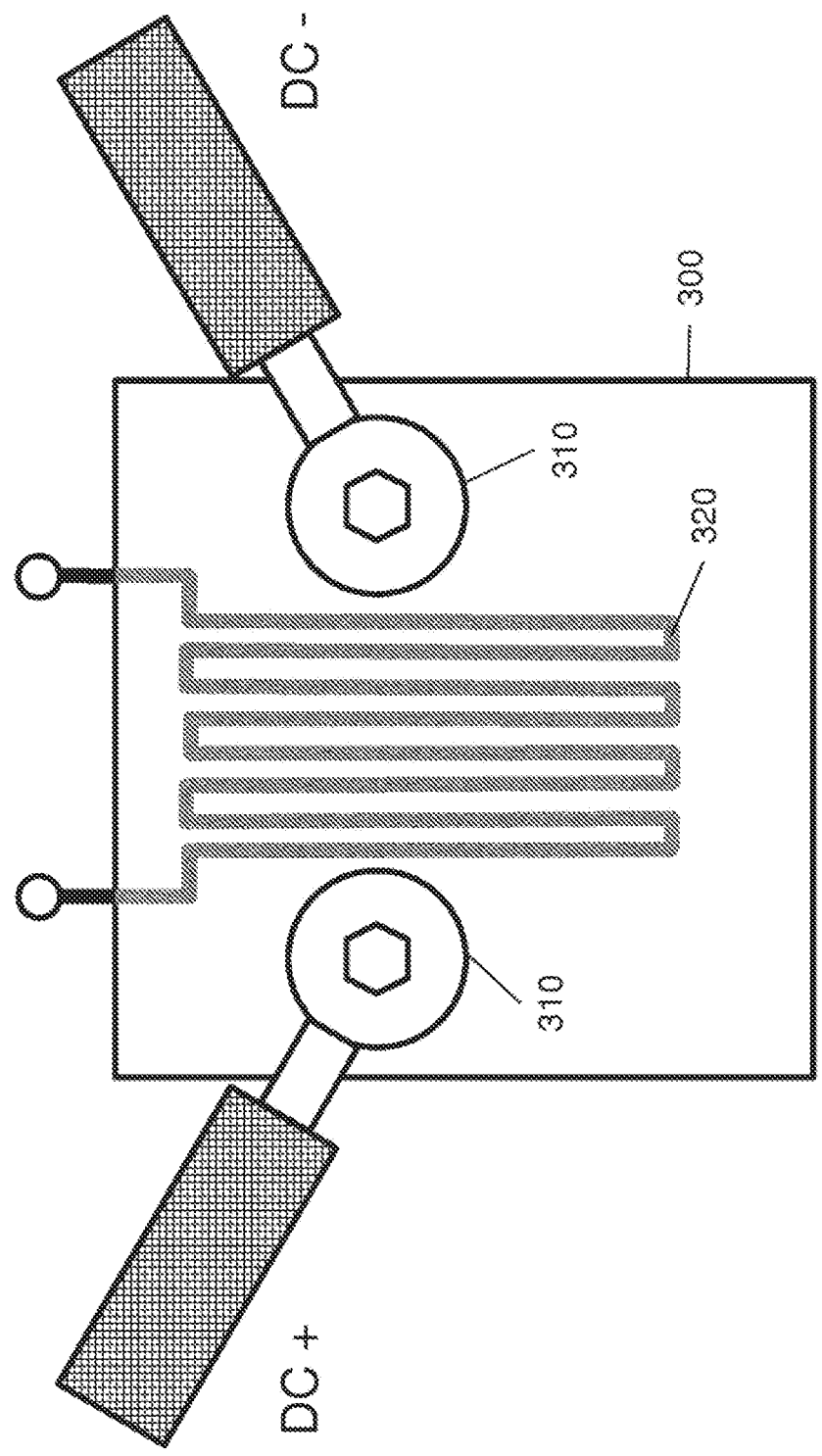
FIG. 3 shows an embodiment according to the disclosure of a heating element as part of a circuit board of the inverter.

FIG. 3 shows a specific arrangement of a resistive heating element 320 as an embodiment of the heating element 130. The heating element 320 is formed by a conductor path as part of a circuit board 300 and runs in meandering fashion in order to enable firstly a desired resistance value and secondly a uniform heating of a circuit board region particularly adversely affected by moisture, for example of an isolation distance between two voltage-carrying conductors 310. The two voltage-carrying conductors 310 can be respectively connected to the connecting lines DC+, DC− to the DC generator 30, such that the entire generator voltage is dropped across the isolation distance. In the case of a multilayer circuit board, the conductor path of the heating element 320 can run within the circuit board, thereby ensuring reliable isolation between the voltage-carrying conductors 310 and the heating element 320 under all operating circumstances. It goes without saying that it is not necessary to position the heating element 320 within the isolation distance between the voltage-carrying conductors 310, rather only an effective heating and thus an effective dehumidification of the isolation region are intended to be ensured.

Figure 4:
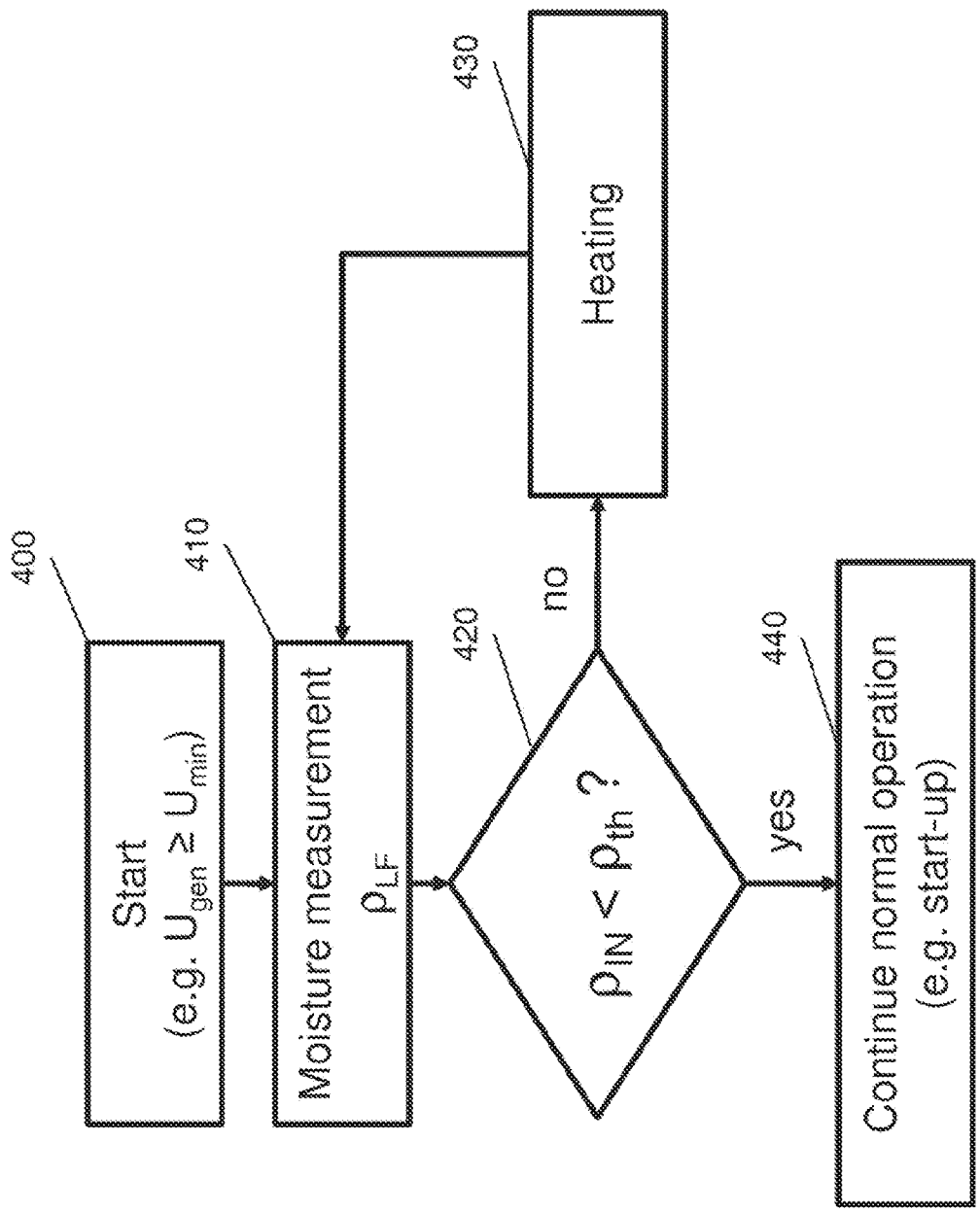
FIG. 4 shows a flowchart for an operating method according to the disclosure.

FIG. 4 shows a flowchart for a method according to the disclosure for operating the inverter 10. A first method act 400 involves checking whether the operation of the inverter can commence, for example by comparing the generator voltage $U_{gen}$ with a predetermined minimum value $U_{min}$ for the start of the inverter. In the case of the minimum value $U_{min}$ being exceeded, a second act 410 involves carrying out a moisture measurement in the interior of the housing of the generator. A third method act 420 involves comparing whether the measured moisture value $\rho_{IN}$ lies below a limit value $\rho_{th}$ that is non-critical for the operation of the generator. If this is not the case (NO at 420), the interior of the inverter is heated in a fourth method act 430 until the moisture measurement determines a moisture value $\rho_{IN}$ in the interior of the inverter that lies below the non-critical limit value $\rho_{th}$. If this is the case (YES at 420), the method branches to a fifth method act 440, in which the normal start-up operation of the inverter is initiated or continued.

In a first variant of the operating method, the electrical power for the preheating of the inverter in the fourth method act 430 is generated by the DC voltage generator 30. The voltage of the DC voltage generator 30 and also the DC voltage in the intermediate direct current link of the converter unit 160 are reduced during this time to an arc-avoiding voltage, for example to a value of less than 80 V. In this case, the voltage is set by the inverter, for example by a corresponding driving of the converter unit 160 by the control unit 120. At the same time, by means of a suitable driving of the switches of the converter unit 160 as described above, at least part of the power generated by the DC voltage generator, for heating the inverter 10, can also be converted into heat by the converter 160, while the rest of the power can be fed to a further heating element. In this case, it is likewise possible to choose a variable value instead of a fixed upper limit value for the generator voltage, the variable value being determined based on the measured moisture value.

In a second variant of the operating method, the electrical power for the preheating of the inverter in the fourth method act 430 originates from the power grid 150 connected to the inverter 10. In this case, it is advantageous to completely isolate the DC voltage generator 30 from the inverter 10 during the preheating phase, and to connect the two components to one another only when the moisture value in the interior of the inverter has fallen below the non-critical limit value.

The above-described method for operating the inverter can be supplemented by monitoring the housing interior of the inverter with regard to the occurrence of a hazard event, for example an arc, a smouldering fire or open fire or excessive heating through to an explosion of components of the inverter. As soon as such an event is detected, the inverter is electrically disconnected both from the power grid 150 and from the DC voltage generator 30 in order to prevent a further power flow into the jeopardized interior of the inverter and thus to remove any source of energy for the event. The monitoring with regard to such events can be effected by means of smoke detection, electrical arc detection or optical or infrared-optical detection.

Figure 5:
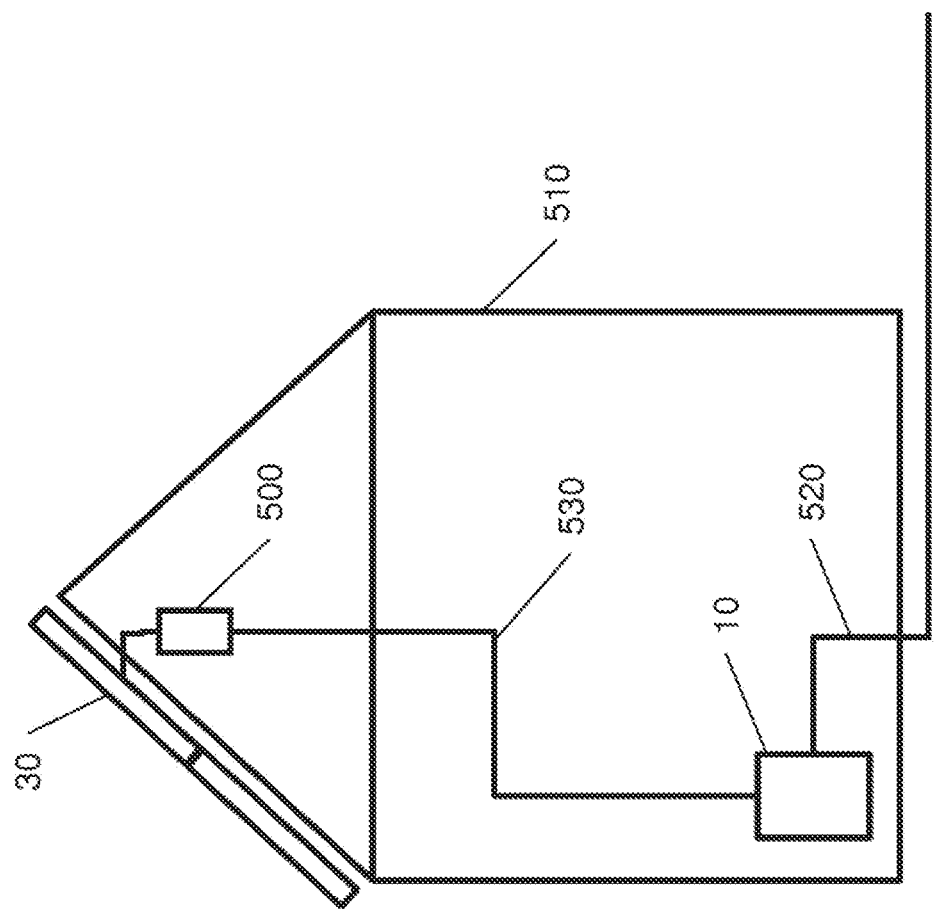
FIG. 5 shows an illustration of a photovoltaic energy generating installation.

FIG. 5 shows a schematic construction of a domestic installation for obtaining electrical energy from photovoltaics. In this case, the roof of a building 510 carries the DC voltage generator 30 in the form of PV modules. The latter are connected via a line breaker 500, which is fitted in the vicinity of the DC voltage generator 30, and a generator lead 530 to the inverter 10 according to the disclosure, which is furthermore connected via a grid lead 520 to a public power supply grid (not shown). In this case, the line breaker 500 is driven via the control unit of the inverter 10 as described above. The spatial separation of the line breaker 500 and the inverter 10 achieves additional safety both in the case of a defect of the inverter 10 and in the case of a house fire, since the generator lead 530 is switched to be voltage-free in these cases, such that it does not constitute any danger to rescue personnel or the occupants of the house. The switching into a voltage-free state can be effected both by the interruption of the leads to the generator and by the short-circuiting thereof.

The disclosure is not restricted to the exemplary embodiments described, which can be modified in diverse ways and supplemented by a person skilled in the art. In particular, it is possible to implement the stated features also in combinations other than those mentioned, and to supplement them by further previously known procedures or components, with the aim of limiting or avoiding harmful effects of moisture that have penetrated into the interior of an inverter, and thus to arrive at an inverter having improved operating safety.

The invention claimed is:

1. An inverter, comprising:
   a moisture sensor inside a housing of the inverter;
   a control unit configured to control the inverter, the control unit being connected to the moisture sensor and configured to receive a moisture value from the moisture sensor; and
   a heating element connected to the control unit,
   wherein the inverter is configured to convert electrical power from a DC voltage generator via a converter unit and feed the electrical power into a power grid, and
   wherein the control unit is configured to control the inverter based on the moisture value such that, in a case where a limit value for the moisture is exceeded, a voltage at an input of the converter unit is controlled to be below an arc-avoiding voltage value and electrical power is fed to the heating element.

2. The inverter as claimed in claim 1, wherein, in the case where the limit value for the moisture is exceeded, the control unit controls the inverter via the converter unit such that the voltage of the DC voltage generator lies below the arc-avoiding voltage value.

3. The inverter as claimed in claim 1, wherein, in the case where the limit value for the moisture is exceeded, the control unit controls the inverter such that the DC voltage generator is disconnected from an input of the converter unit.

4. The inverter as claimed in claim 1, wherein the heating element is a resistive heating element.

5. The inverter as claimed in claim 4, wherein the resistive heating element comprises a conductor path of a circuit board.

6. The inverter as claimed in claim 1, wherein the heating element comprises a semiconductor switch of the converter unit.

7. The inverter as claimed in claim 1, wherein the inverter further comprises a fan configured to generate an air flow, in the air flow of which the heating element is arranged.

8. The inverter as claimed in claim 1, wherein the moisture sensor comprises a plurality of sensors, wherein one of the sensors is arranged in a vicinity of connection conductors of the DC voltage generator, and a further one of the sensors is arranged in a vicinity of a moisture collecting region of the housing.

9. The inverter as claimed in claim 1, wherein the electrical power is fed to the heating element at least partly from the DC voltage generator.

10. The inverter as claimed in claim 1, wherein the electrical power is fed to the heating element at least partly from the power grid.

11. The inverter as claimed in claim 1, further comprising an AC switch driven by the control unit, wherein the AC switch is configured to isolate the inverter from the power grid as long as the limit value for the moisture is exceeded.

12. The inverter as claimed in claim 1, wherein the arc-avoiding voltage value is less than 80 V.

13. The inverter as claimed in claim 1, further comprising:
   a protection unit; and
   at least one safety sensor connected to the protection unit and configured to monitor the housing interior with regard to the occurrence of a hazard event,
   wherein the protection unit is configured to isolate the inverter from the DC voltage generator and from the power grid when the hazard event occurs and is detected by the at least one safety sensor.

14. The inverter as claimed in claim 13, wherein the safety sensor comprises a smoke detector, an electrical arc detector, a temperature sensor, an optical detector or an infrared detector.

15. The inverter as claimed in claim 13, wherein the inverter has a plastic housing.

16. The inverter as claimed in claim 15, wherein the plastic of the housing comprises flame-retarding material.

17. The inverter as claimed in claim 1, wherein the inverter is configured to detect a time duration in which the moisture exceeds the limit value.

18. The inverter as claimed in claim 1, wherein the DC voltage generator comprises a photovoltaic generator.

19. A method for operating an inverter, which is configured to feed a power generated by a DC voltage generator into a power grid, comprising:
   determining a moisture value in an interior of a housing of the inverter;
   in a case where a limit value for the moisture value is exceeded, setting a voltage at an input of a converter unit of the inverter to a value below an arc-avoiding voltage value, wherein a power generated by the DC voltage generator and/or a power drawn from the power grid are/is at least predominantly converted into heat in the housing, and
   in a case where the limit value is not exceeded, setting the DC voltage generator voltage to an MPP voltage.

20. The method as claimed in claim 19, wherein, in the case where the limit value is exceeded, disconnecting the inverter from the power grid, such that the power converted into heat in the housing is transmitted exclusively from the DC voltage generator to the inverter.

21. The method as claimed in claim 19, wherein, in the case where the limit value is exceeded, disconnecting the inverter from the DC voltage generator, such that the power converted into heat in the housing is drawn exclusively from the power grid.

22. The method as claimed in claim 19, wherein the conversion into heat comprises driving switches of the converter unit of the inverter.

23. The method as claimed in claim 19, wherein the arc-avoiding voltage value is determined based on the moisture value.

24. The method as claimed in claim 19, further comprising determining a time duration until a limit value for the moisture value is not exceeded.

25. The method as claimed in claim 19, wherein the method is carried out as part of a start-up operation.

26. The method as claimed in claim 19, wherein the moisture value is determined repeatedly until the limit value is not exceeded.

27. The method as claimed in claim 19, further comprising:
   monitoring the housing interior of the inverter with regard to an occurrence of a hazard event; and
   isolating the inverter from the power grid and from the DC voltage generator when the hazard event occurs.

28. The method as claimed in claim 27, wherein the monitoring comprises at least one of the following monitoring methods:
   smoke detection,
   electrical arc detection,
   optical arc detection, and
   selective detection of excessive heating of components of the inverter.

* * * * *